US008527368B1

(12) United States Patent
Charles et al.

(10) Patent No.: US 8,527,368 B1
(45) Date of Patent: Sep. 3, 2013

(54) PURCHASE CARD DATA PERSISTENCE USING MOBILE CARD READER IN DIRECT SALES SYSTEM

(75) Inventors: Jade Makani Roberge Charles, San Diego, CA (US); Ryan Blair, Los Angeles, CA (US)

(73) Assignee: Fragmob, LLC, San Diego, CA (US)

( * ) Notice: Subject to any disclaimer, the term of this patent is extended or adjusted under 35 U.S.C. 154(b) by 0 days.

(21) Appl. No.: 13/615,019

(22) Filed: Sep. 13, 2012

Related U.S. Application Data

(63) Continuation-in-part of application No. 13/543,451, filed on Jul. 6, 2012, now Pat. No. 8,463,661.

(51) Int. Cl.
*G06Q 30/00* (2012.01)
*G06F 17/30* (2006.01)

(52) U.S. Cl.
USPC ............... 705/26.8; 705/26.1; 705/27.1

(58) Field of Classification Search
USPC ....................... 705/26.1–27.2, 26.8
See application file for complete search history.

(56) References Cited

U.S. PATENT DOCUMENTS

| | | | | |
|---|---|---|---|---|
| 7,086,590 | B2 * | 8/2006 | Yamagami et al. | 235/383 |
| 2004/0128256 | A1 * | 7/2004 | Krouse et al. | 705/65 |
| 2006/0190325 | A1 * | 8/2006 | Tarsh | 705/14 |
| 2008/0177662 | A1 * | 7/2008 | Smith et al. | 705/44 |
| 2009/0063285 | A1 * | 3/2009 | Ablowitz et al. | 705/17 |
| 2009/0069049 | A1 * | 3/2009 | Jain | 455/558 |
| 2009/0070271 | A1 * | 3/2009 | Sarkissian et al. | 705/75 |
| 2009/0125429 | A1 * | 5/2009 | Takayama | 705/35 |
| 2010/0057616 | A1 * | 3/2010 | Kapur et al. | 705/44 |
| 2010/0057623 | A1 * | 3/2010 | Kapur et al. | 705/72 |
| 2010/0258620 | A1 * | 10/2010 | Torreyson et al. | 235/379 |
| 2011/0251910 | A1 * | 10/2011 | Dimmick | 705/17 |
| 2012/0072350 | A1 * | 3/2012 | Goldthwaite et al. | 705/44 |
| 2012/0078783 | A1 * | 3/2012 | Park | 705/41 |
| 2012/0118953 | A1 * | 5/2012 | Diamond | 235/380 |

OTHER PUBLICATIONS

"2Checkout.com, Inc.; WHMCS Adds 2Checkout Recurring Billing Support." Information Technology Weekly. Aug. 16, 2011. 1124. [recovered from ProQuest on Jul. 8, 2013].*

* cited by examiner

*Primary Examiner* — Matthew Zimmerman
*Assistant Examiner* — Kathleen G Palavecino
(74) *Attorney, Agent, or Firm* — Mark Terry

(57) ABSTRACT

A method facilitating purchase of goods over a communications network is disclosed. The method includes a mobile computing device reading buyer enrollment data and purchase card data from a purchase card of the buyer, encrypting the purchase card data and transmitting the data to a server. The method also includes a server generating a record associated with the buyer, transmitting encrypted purchase card data and a request for payment to a payment gateway, and transmitting an order for the one or more products. The method further includes the server detecting the passage of a predetermined period of time, accessing the record of the buyer, reading the encrypted purchase card data and the product identifier from the record, transmitting the encrypted purchase card data and a request for payment to the payment gateway, and transmitting an order for the one or more products.

14 Claims, 4 Drawing Sheets

PURCHASE CARD DATA PERSISTENCE USING MOBILE CARD READER IN DIRECT SALES SYSTEM

CROSS-REFERENCE TO RELATED APPLICATIONS

This patent application is a continuation-in-part of, and claims priority to, U.S. patent application Ser. No. 13/543,451, filed Jul. 6, 2012 now U.S. Pat. No. 8,463,661, titled "Credit Card Authorization Process for Direct Sales System Employing Networked Mobile Computing Devices." The subject matter of U.S. patent application Ser. No. 13/543,451 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of sales, advertising and marketing and, more specifically, the present invention relates to the field of direct sales activities on electronic devices.

BACKGROUND OF THE INVENTION

The present invention relates to direct sales activities of all types. Direct selling is the marketing and selling of products directly to consumers away from a fixed retail location. Modern direct selling includes sales made through a party plan, one-on-one demonstrations, and other personal contact arrangements, as well as internet sales. Thus, direct sales include direct personal presentation, product demonstration, and sales of products and services to consumers, usually in their homes or at their jobs. One form of direct selling includes multi-level marketing (MLM), which is a marketing strategy in which a sales force is compensated not only for product sales they personally generate, but also for the product sales of others they recruit, thereby creating a downstream of distributors and a hierarchy of multiple levels of compensation.

One of the drawbacks associated with direct sales activities involves the use of purchase cards when effectuating sales. Conventionally, purchase cards (including credit cards, charge cards, debit cards, gift cards, points cards, etc.) are used by purchasers at a physical point-of-sale, such as a cash register or a brick and mortar shop, or an online point-of-sale, which includes the online checkout process. At physical points-of-sale, purchase cards are usually swiped through a card reader, while online points-of-sale require that purchase card data is input manually. These constraints limit the locations and circumstances where purchase cards can be used. This can be a disadvantage in direct sales situations where consumers are engaged at home or at their jobs, i.e., away from conventional points-of-sale.

Another drawback associated with direct sales activities involves recurring sales. In certain situations, consumers often desire to have products or services delivered to them regularly. One example of recurring sales involves food products, such as nutritional supplements, that are consumed at a fast rate and require replenishment regularly, such as once a month. If a consumer desires to use his purchase card for recurring sales, however, the purchase card must be swiped through a card reader, or its data input manually, for each recurring sale. This can be tedious and time-consuming for a consumer.

Therefore, what is needed is a system and method for improving the problems with the prior art, and more particularly for a more efficient method and system for facilitating the use of purchase cards in the course of direct sales activities.

BRIEF SUMMARY OF THE INVENTION

In one embodiment, the present invention discloses a method for facilitating purchase of goods over a communications network. The method includes a mobile computing device reading purchase card data from a purchase card of the buyer and buyer enrollment data, which includes at least contact information for the buyer, and a product identifier for one or more products. The mobile computing device further encrypts the purchase card data so as to produce encrypted purchase card data and transmits the buyer enrollment data and the encrypted purchase card data, to a server via the communications network. Next, the server generates one or more records associated with the buyer, wherein the one or more records comprise the buyer enrollment data and the encrypted purchase card data, transmits the encrypted purchase card data, and a request for payment of a monetary amount corresponding to the one or more products, to a payment gateway via the communications network, and transmits, via the communications network, an order for the one or more products, wherein the order includes at least the product identifier and the contact information for the buyer. Then, the server detects the passage of a predetermined period of time, accesses the one or more records associated with the buyer, reads the encrypted purchase card data and the product identifier from the one or more records, transmits the encrypted purchase card data, and a request for payment of a monetary amount corresponding to the one or more products, to the payment gateway via the communications network, and transmits, via the communications network, an order for the one or more products.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention improves upon the problems with the prior art by providing a system that allows for the storage and re-use of purchase card data for recurring sales. The present invention reduces or eliminates the need for a purchase card to be read or swiped through a card reader after an initial sale. This is advantageous for direct sales systems that lack conventional brick-and-mortar stores, thereby increasing the manner in which purchase cards can be used. Further, since typical direct sales situations engage consumers at home or at their jobs, i.e., away from conventional points-of-sale, there are fewer opportunities to physically interact with a consumer after the first sale. The present invention cures this deficiency by providing automatic, recurring shipment of goods, and corresponding billing, to the consumer after the first sale, without requiring an in-person visit with the consumer after the first sales visit. An additional benefit of the present invention is the provision of automatic shipment of goods that are consumed at a fast rate and require replenishment regularly, such as food products, without requiring a purchase card to be read or swiped through a card reader after the first sale.

The present invention further provides a system that grants commissions for sales effectuated by a salesman, thereby providing an incentive for salesman to push the products they are selling. This provides an incentive system whereby salesmen have an incentive (i.e., a commission) to persuade the consumers to purchase the goods or services he or she is selling.

Figure 1:
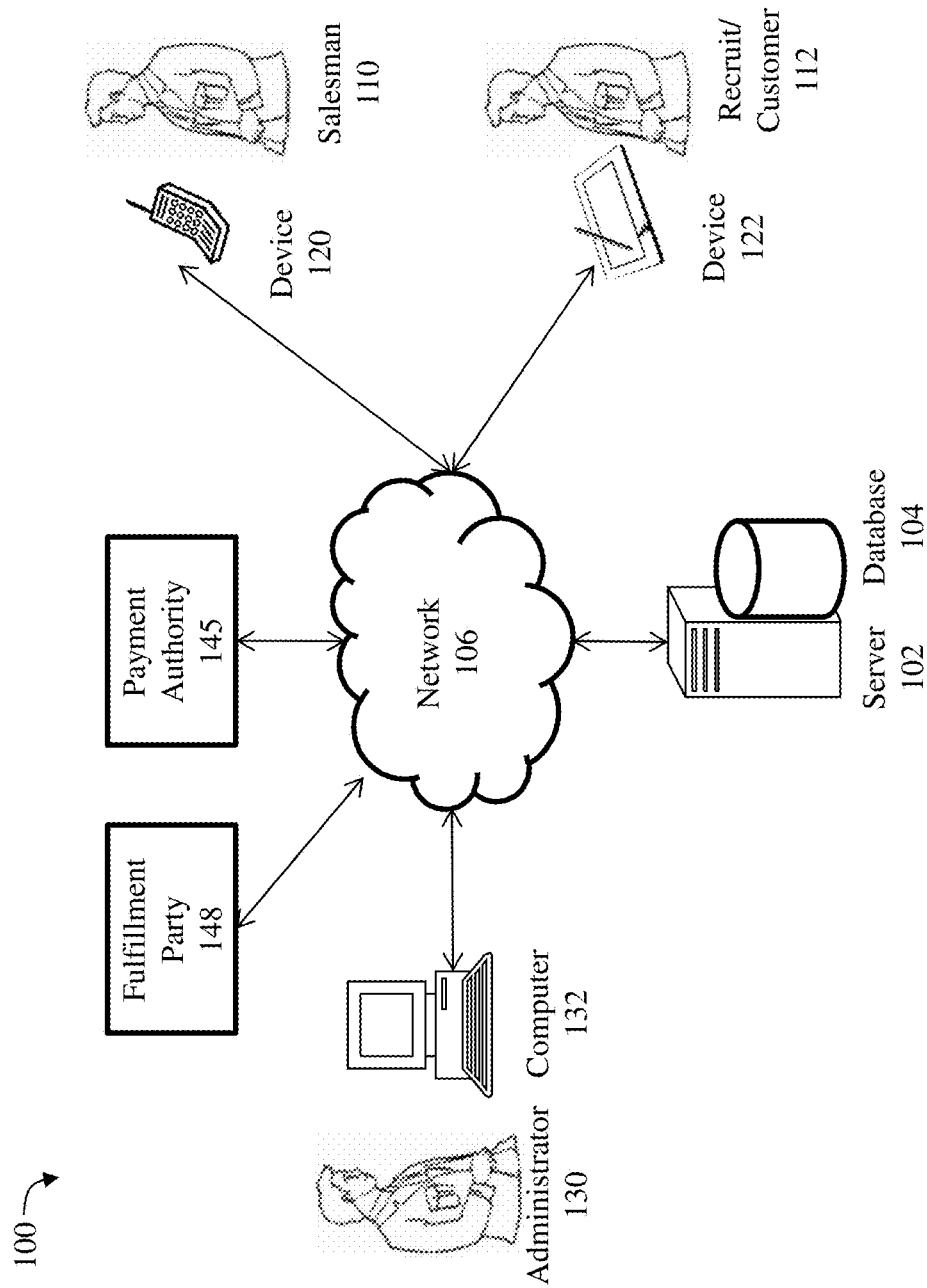
FIG. 1 is a block diagram illustrating the network architecture of a system for facilitating purchase of goods using purchase cards over a communications network, in accordance with one embodiment of the present invention.

Referring now to the drawing figures in which like reference designators refer to like elements, there is shown in FIG. 1 an illustration of a block diagram showing the network architecture of a system 100 and method for facilitating purchase of goods over a communications network in accordance with the principles of the present invention. A prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality that executes on computing devices 120, 122 and 132, namely, the processing of sales transactions and the enrollment and/or recruitment of customers, all of which are provided to the users 110, 112 and 130, wherein the provision of the foregoing functionality facilitates the performance of direct sales activities.

FIG. 1 further includes mobile computing devices 120 and 122, which may be smart phones, mobile phones, tablet computers, handheld computers, laptops, or the like. Mobile computing devices 120 and 122 correspond to a salesman 110 and a recruit or customer 112 of the salesman 112. A salesman 110, also known as a distributor, is a member of a direct sales force who sells products/services to customers and recruits others to do the same. A salesman's recruits may also be known as distributors. A salesman 110 receives compensation for his own product/service sales, as well as the sales of his recruits, often via a commission. A customer simply refers to a person to whom a salesmen sales products or services. Computer 132 corresponds to an administrator 130, who may perform supervisory or administrative tasks on server 102. Administrator 130 may, for example, set sales milestones for the users 110, 112. Computer 132 may be a mobile computing device, a desktop computer, a common computer terminal or the like.

FIG. 1 further shows that server 102 includes a database or repository 104, which may be a relational database comprising a Structured Query Language (SQL) database stored in a SQL server. Devices 120, 122 and 132 may also each include their own database. The repository 104 serves data from a database, which is a repository for data used by server 102 and devices 120, 122, 132 during the course of operation of the invention. Database 104 may be distributed over one or more nodes or locations that are connected via network 106.

The database 104 may include a user record for each salesman 110 and recruit or customer 112. A user record may include: contact/identifying information for the user (name, address, telephone number(s), email address, etc.), contact/identifying information for the participant that recruited the user (if any), information pertaining to sales attributed to the user, contact/identifying information for recruits of the user, information pertaining to sales attributed to recruits of the user, electronic payment information for the user, information pertaining to the purchases made by the user, etc. A user record may also include a unique identifier for each user, a residential address for each user, the current location of each user (based on location-based services from the user's mobile computer) and a description of past products purchased by each user. A user record may further include demographic data for each user, such as age, sex, income data, race, color, marital status, etc. Recruit enrollment data, or buyer enrollment data, includes any data that is entered into a user record for a recruit or customer 112 when the recruit or customer is recruited and enrolled by a salesman 112.

Sales transaction data, for example, may be stored in the database 104 and associated with a record for the user initiating the sale and/or the customer purchasing products or services. Sales transaction data may include one or more product identifiers (such as SKUs), one or more product amounts, buyer contact/identifying information, product shipping information and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. Sales transaction data may further include a period of time (such as monthly) that defines how often a given product or service is provided or shipped to a consumer, as well as a specified day within the period of time (such as on the $15^{th}$ of each month) that the given product or service is provided or shipped to the consumer.

The database 104 may also include a record for each administrator 130. A record for an administrator may include: commission data that defines how salesmen are compensated for their own sales, commission data that defines how salesmen are compensated for the sales of their recruits, milestone data that defines thresholds that result in an award, personal sales goals, group sales goals, discount offers, etc.

FIG. 1 shows an embodiment of the present invention wherein networked computing devices 120, 122 and 132 interact with server 102 and repository 104 (as well as entities 145, 148) over the network 106. Server 102 includes a software engine that delivers applications, data, program code and other information to networked computing devices 120, 122 and 132 (as well as entities 145, 148). It should be noted that although FIG. 1 shows only the networked computers 145, 148, 102, 120, 122 and 132, the system of the present invention supports any number of networked computing devices connected via network 106.

Server 102, entities 145, 148, and devices 120, 122 and 130 include program logic comprising computer source code, scripting language code or interpreted language code that may be compiled to produce an executable file or computer instructions, or that may be interpreted at run-time, wherein the computer source code performs various functions of the present invention.

Note that although server 102 is shown as a single and independent entity, in one embodiment of the present invention, the functions of server 102 may be integrated with another entity, such as one of the devices 120, 122, payment authority 145 or fulfillment party 148. Further, server 102 and its functionality, according to a preferred embodiment of the present invention, can be realized in a centralized fashion in one computer system or in a distributed fashion wherein different elements are spread across several interconnected computer systems.

FIG. 1 also shows a payment authority 145, which acts to effectuate payments by salesman 110 and/or recruit/customer 112 for products, services or the like. In the course of a sales transaction, server 102 may interface with payment authority 145 to effectuate payment. In one embodiment of the present invention, the payment authority 145 is a payment gateway, which is an e-commerce Application Service Provider (ASP) service that authorizes and processes payments from one party to another. The payment authority 145 may accept payment via the use of purchase cards, i.e., credit cards, charge cards, bank cards, gift cards, account cards, etc.

FIG. 1 further shows fulfillment party 148, which performs product fulfillment or order fulfillment services, i.e., the process of fulfilling the obligation of server 102 (or the entity represented by server 102) to send a customer one or more products that the customer has ordered, purchased, or requested from the server 102 (or the entity represented by server 102). Fulfillment party 148 may store products, receive orders for the products, package the products, and then ship the ordered products to the end customer. In the course of a sales transaction, the server 102 may interface with fulfillment party 148 to effectuate the delivery of purchased products or services to the customers after payment has been effectuated via the payment authority 145. Note that although party 148 is shown as a single and independent entity, in one embodiment of the present invention, the functions of party 148 may be integrated with another entity, such as server 102. Further, the functionality of party 148 may be realized in a centralized fashion in one computer system or in a distributed fashion wherein different elements are spread across several interconnected computer systems.

Figure 2:
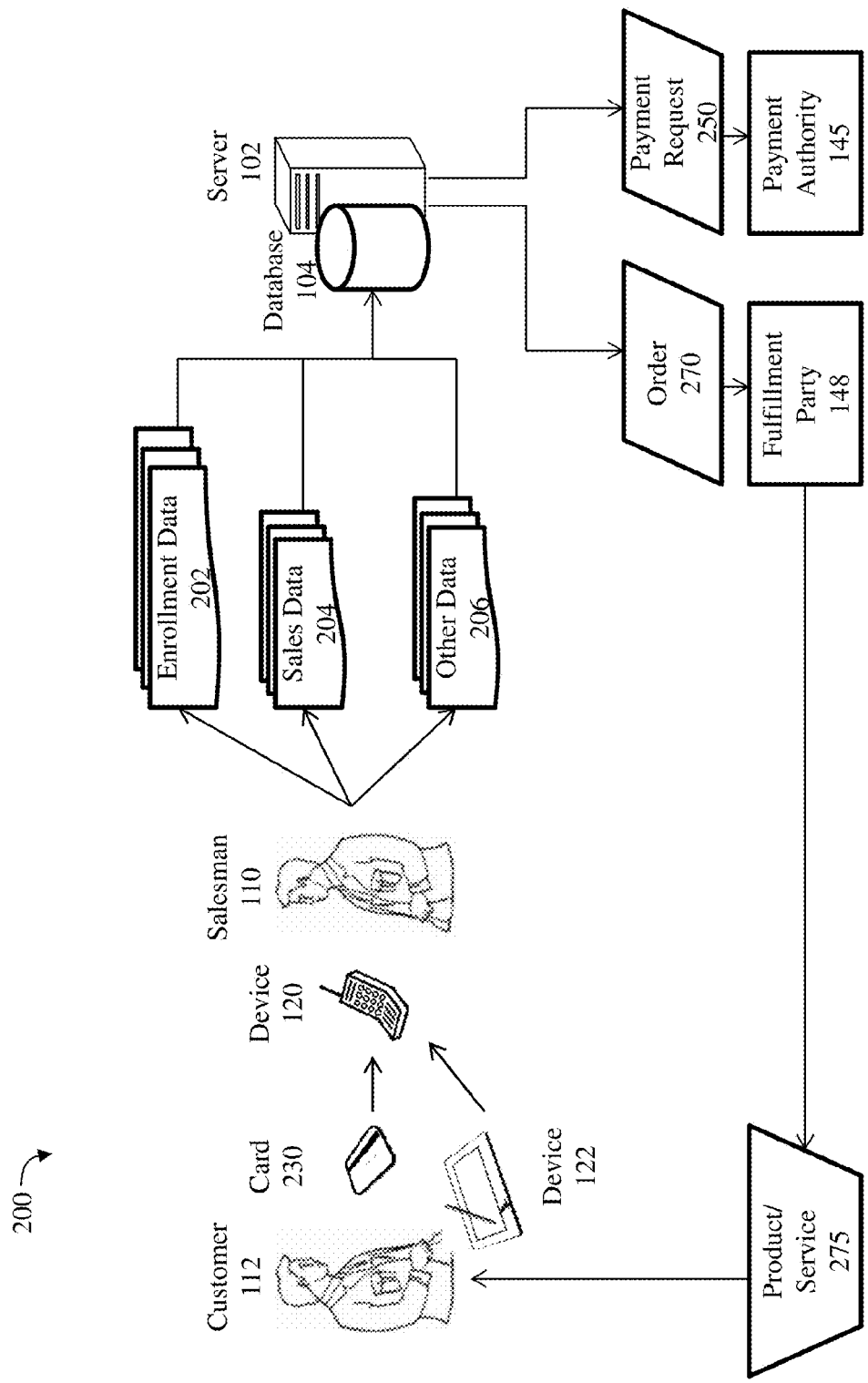
FIG. 2 is a block diagram showing the various data that is entered, stored, processed and managed according to one embodiment of the present invention.

FIG. 2 is a block diagram 200 showing the various data that is entered, stored, processed and managed according to one embodiment of the present invention. The block diagram of FIG. 2 shows the flow of data that occurs in an example transaction where salesman 110 uses his device 120 to register or enroll customer 112 and effectuate one or more sales of products or services to customer 112. In the example transaction, customer 112 uses his purchase card 230 to purchase products or services.

FIG. 2 shows that salesman 110 may enter various data sets into database 104 for processing and management by server 102. Salesman 110 may enter enrollment data 202 (i.e., buyer enrollment data), sales transaction data 204, and other data 206 into database 104. Salesman 110 may enter enrollment data 202 into his device 120 by manually entering data into a mobile application via keypad, touchpad, or via voice. Salesman 110 may alternatively enter enrollment data 202 into his device 120 by using Radio Frequency Identification (RFID), or Near Field Communication (NFC) to create a communications connection between device 120 (of salesman 110) and device 122 of the customer 112. RFID is the use of a wireless non-contact system that uses radio-frequency electromagnetic fields to transfer data from one node to another. NFC is a set of standards for smart-phones and similar devices to establish radio communication with each other by touching them together or bringing them into close proximity.

Salesman 110 may enter sales transaction data 204, or a portion thereof, into his device 120 by manually entering data into a mobile application via keypad, touchpad, or via voice. Salesman 110 may also enter sales transaction data 204, or a portion thereof, into his device 120 by swiping the purchase card 230 of customer 112 through a card reader communicatively coupled with the device 120. A card reader is a data input device that reads data from a card-shaped storage medium. One example of a card reader is a magnetic card reader, which reads magnetic stripe cards, such as credit cards. A mobile card reader is a card reader that is communicatively coupled with a mobile computing device. Salesman 110 may alternatively enter sales transaction data 204 into his device 120 by using RFID or NFC to create a communications connection between device 120 and either a purchase card 230 or device 122 of the customer 112. In one embodiment, upon reading any purchase card data from purchase card 230, the device 120 immediately encrypts the purchase card data that was read, so as to produce encrypted purchase card data. In this embodiment, the encrypted purchase card data from the purchase card 230 is transmitted to the server 102 in sales transaction data 204.

Salesman 110 may also enter other data 206 into his device 120 either manually or via other methods, as described above. Other data 206 may include additional data about the customer 112 and/or the sales transaction data 204. In one embodiment, other data 206 may include a predefined period of time that defines how often the customer 112 desires to have a defined set of products or services shipped, and billed to, the customer 112, i.e., an automatic, recurring purchase card payment. For example, other data 206 may include an indicator that indicates a monthly shipment, and corresponding billing, of goods. Other data 206 may further include a specified day in the predefined period of time that defines when the customer 112 desires to have the defined set of products or services shipped, and billed to, the customer 112. For example, other data 206 may include an indicator that indicates a monthly shipment, and corresponding billing, of goods on the $15^{th}$ of each month.

Note that data sets 202, 204, 206 entered into database 104 are associated with the user record for salesman 110 and customer 112. In one embodiment, the data sets 202, 204, 206 may be used by server 102 to calculate commissions. The formula for calculating a commission may comprise, for example, a certain percentage of gross or net sales of an individual and a certain percentage of gross or net sales of an individual's recruits. The formula for calculating a commission may also take other data into account, such as volume of sales, speed of sales, etc.

FIG. 2 further shows that subsequent to the entry of data 202-206 into database 104, server 102 sends a request for payment 250 to payment authority 145. The request for payment 250 may include any of the enrollment data 202, sales transaction data 204 or other data 206. At a minimum, the request for payment 250 may include the monetary amount that corresponds to the products or services that will be delivered to the customer 112 and data garnered from the purchase card 230. Additionally, server 102 sends an order 270 to fulfillment party 148. The order 270 may include any of the enrollment data 202, sales transaction data 204 or other data 206. At a minimum, the order 270 may include a description or identifiers (such as SKUs) for the products or services that will be delivered to the customer 112 and the contact information for the customer 112. Subsequently, the fulfillment party 148 fulfills the order 270 by shipping or delivering the specified products or services 275 to the customer 112.

In an embodiment where the customer 112 desires to have the defined set of products or services shipped, and billed to, the customer 112, i.e., an automatic, recurring purchase card payment, a series of steps are undertaken upon the detection of each passage of the time period. At the end of each time period, the server 102 sends a request for payment 250 to payment authority 145 and the server 102 sends an order 270 to fulfillment party 148. Subsequently, the fulfillment party 148 fulfills the order 270 by shipping or delivering the specified products or services 275 to the customer 112.

Figure 3:
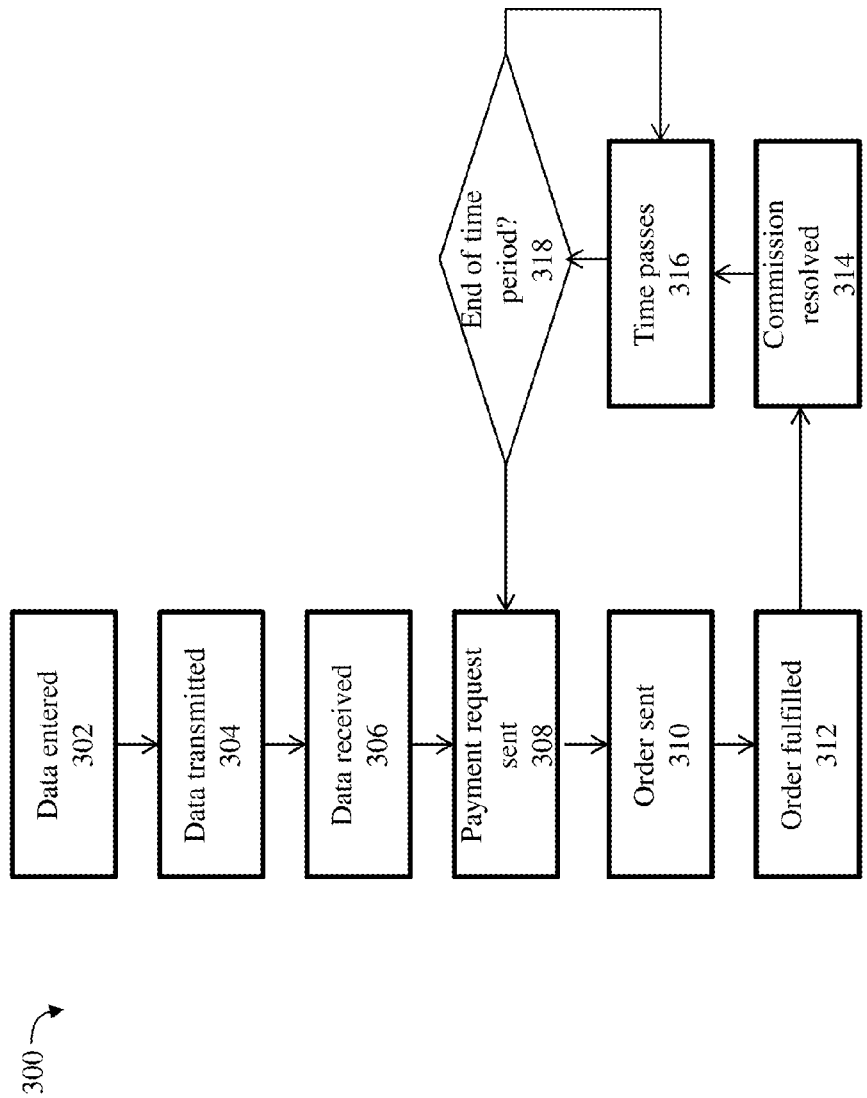
FIG. 3 is a flow chart depicting the general control flow of a process for facilitating purchase of goods using purchase cards over a communications network, according to one embodiment of the present invention.

FIG. 3 is a flow chart depicting the general control flow of a process 300 for facilitating purchase of goods using purchase cards over a communications network, according to one embodiment of the present invention. Method 300 describes the steps that occur when a salesman 110 both enrolls or recruits customer 112 and effectuates a recurring sale of goods or services to customer 112, using a purchase card 230 of the customer. The process 300 is described with reference to FIG. 2, which is a diagram 200 showing the data flow of the aforementioned process.

In step 302, the salesman 110 enters the enrollment data 202, the sales data 204 and the other data 206 into the device 120, using the purchase card 230 of the customer 112. In step 304, the device 120 sends the enrollment data 202, the sales data 204 and the other data 206 to the server 102 via communications network 106. In step 306, the server 102 receives the enrollment data 202, the sales data 204 and the other data 206 stores the data into one or more newly created user records in database 104. In step 308, the server 102 sends a request for payment 250 to payment authority 145. The request for payment 250 may include the monetary amount that corresponds to the products or services that will be delivered to the customer 112 and data garnered from the purchase card 230. In step 310, the server 102 sends an order 270 to fulfillment party 148. The order 270 may include a description or identifiers (such as SKUs) for the products or services that will be delivered to the customer 112 and the contact information for the customer 112. In step 312, the fulfillment party 148 fulfills the order 270 by shipping or delivering the specified products or services 275 to the customer 112.

In step 314, the server 102 calculates a commission for salesman 110 based on the amount of the sale specified in step 310, and pays the amount of the commission to the salesman 110 via wire transfer, check, gift card, credits, etc. In step 316, an increment of time, such as one day, passes.

In step 318, the server 102 determines whether the passage of the predefined time period, such as the predefined period of time specified in other data 206, has occurred. If the determination of step 318 is positive, then at the end of the predefined time period, control flows back to steps 308 through 314, wherein the server 102 sends a request for payment 250 to payment authority 145, sends an order 270 to fulfillment party 148, which fulfills the order, and a sales commission is resolved. If the determination of step 318 is negative, then control flows back to step 316.

Figure 4:
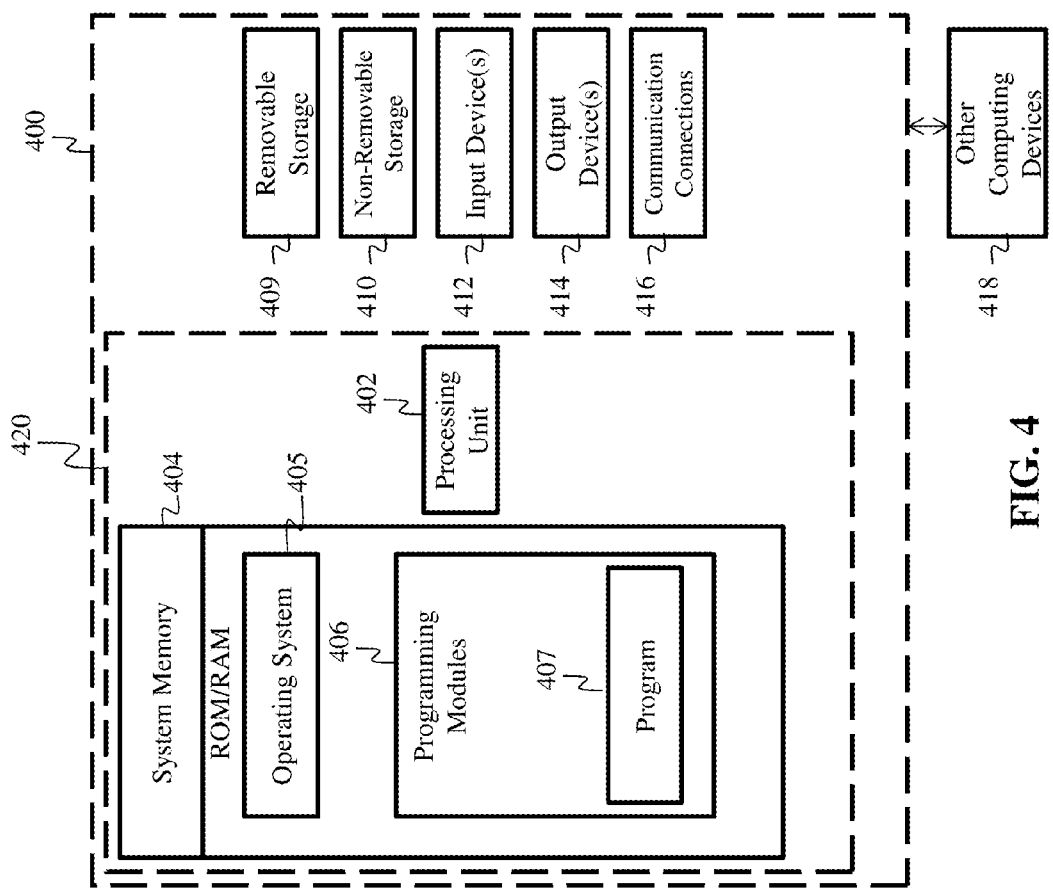
FIG. 4 is a block diagram of a system including an example computing device and other computing devices.

FIG. 4 is a block diagram of a system including an example computing device 400 and other computing devices. Consistent with the embodiments described herein, the aforementioned actions performed by 102, 120, 122, 145, 148 and 132 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the methods shown in FIGS. 2-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIGS. 2-3 above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating a recurring purchase of goods over a communications network, comprising:
   reading, on a mobile computing device coupled to the communications network, purchase card data from a purchase card of a buyer and buyer enrollment data comprising at least contact information for the buyer, and a product identifier for one or more products;
   encrypting, on the mobile computing device, the purchase card data so as to produce encrypted purchase card data;
   transmitting, by the mobile computing device, the buyer enrollment data and the encrypted purchase card data, to a server via the communications network;
   generating, by the server, one or more records associated with the buyer, wherein the one or more records comprise the buyer enrollment data and the encrypted purchase card data;
   transmitting, by the server, the encrypted purchase card data, and a request for payment of a monetary amount corresponding to the one or more products, to a payment gateway via the communications network;
   transmitting, by the server, via the communications network, an order for the one or more products to a fulfillment party, wherein the order includes at least the product identifier and the contact information for the buyer;
   detecting, by the server, the passage of a period of time; and
   responsive to detecting the passage of the period of time, executing the following steps:
   (a) accessing, by the server, the one or more records associated with the buyer and reading the encrypted purchase card data and the product identifier from the one or more records;
   (b) transmitting, by the server, the encrypted purchase card data that was read, and a request for payment of a monetary amount corresponding to the one or more products of the product identifier that was read, to the payment gateway via the communications network; and
   (c) transmitting, by the server, via the communications network, an order to the fulfillment party for the one or more products.

2. The method of claim 1, wherein the step of reading purchase card data further comprises:

reading, on the mobile computing device, a period of time and a specified day within the period of time, wherein the period of time and specified day are defined by the buyer.

3. The method of claim 2, wherein the step of reading purchase card data further comprises:
reading, on the mobile computing device, purchase card data from the purchase card of the buyer via a mobile card reader.

4. The method of claim 1, further comprising:
calculating, on the server, a commission for an individual associated with the mobile computing device, wherein the commission is based on the monetary amount corresponding to the one or more products.

5. The method of claim 4, further comprising:
effectuating, on the server, a transfer of the commission to the individual associated with the mobile computing device.

6. A method for facilitating a recurring purchase of goods over a communications network, comprising:
reading, on a mobile computing device coupled to the communications network, purchase card data from a purchase card of a buyer and buyer enrollment data comprising at least contact information for the buyer, a product identifier for one or more products, and a period of time;
encrypting, on the mobile computing device, the purchase card data so as to produce encrypted purchase card data;
transmitting, by the mobile computing device, the buyer enrollment data and the encrypted purchase card data to a server, via the communications network;
generating, by the server, one or more records associated with the buyer, wherein the one or more records comprise the buyer enrollment data and the encrypted purchase card data;
transmitting, by the server, the encrypted purchase card data, and a request for payment of a monetary amount corresponding to the one or more products, to a payment gateway, via the communications network;
transmitting, by the server, via the communications network, an order for the one or more products to a fulfillment party, wherein the order includes at least the product identifier and the contact information for the buyer;
detecting, by the server, the passage of the period of time; and
responsive to detecting the passage of the period of time, executing the following steps:
(a) accessing, by the server, the one or more records associated with the buyer and reading the encrypted purchase card data and the product identifier from the one or more records;
(b) transmitting, by the server, the encrypted purchase card data that was read, and a request for payment of a monetary amount corresponding to the one or more products of the product identifier that was read, to the payment gateway via the communications network; and
(c) transmitting, by the server, via the communications network, an order for the one or more products to the fulfillment party.

7. The method of claim 6, wherein the step of reading purchase card data further comprises:
reading, on the mobile computing device, a specified day within the period of time, wherein the specified day is defined by the buyer.

8. The method of claim 7, wherein the step of reading purchase card data further comprises:
reading, on the mobile computing device, purchase card data from the purchase card of the buyer via a mobile card reader.

9. The method of claim 6, further comprising:
calculating, on the server, a commission for an individual associated with the mobile computing device, wherein the commission is based on the monetary amount corresponding to the one or more products.

10. The method of claim 9, further comprising:
effectuating, on the server, a transfer of the commission to the individual associated with the mobile computing device.

11. A system for facilitating a recurring purchase of goods over a communications network, comprising:
a mobile computing device comprising:
a graphical user interface for reading buyer enrollment data, which includes at least contact information for the buyer, and a product identifier for one or more products, and a period of time defining how often a purchase of the one or more products will occur;
a mobile card reader for reading purchase card data from a purchase card of the buyer;
a processor configured for encrypting the purchase card data so as to produce encrypted purchase card data;
a network interface connection for coupling the mobile computing device to the communications network; and
a transmitter for transmitting the buyer enrollment data and the encrypted purchase card data, to a server via the network interface connection and communications network; and
a server comprising:
a network interface communication for coupling the server to the communications network;
a receiver, coupled to the network interface connection, for receiving the buyer enrollment data and the encrypted purchase card data transmitted from the mobile device;
a database for storing one or more records associated with the buyer, wherein the one or more records comprise the buyer enrollment data and the encrypted purchase card data that was received;
a transmitter for transmitting, via network interface connection and the communications network, the encrypted purchase card data, and a request for payment of a monetary amount corresponding to the one or more products, to a payment gateway, and for transmitting an order for the one or more products to a fulfillment party, wherein the order includes at least the product identifier and the contact information for the buyer;
a processor configured for detecting the passage of the period of time, and responsive to detecting the passage of the period of time, executing the following steps:
accessing the one or more records associated with the buyer, and reading the encrypted purchase card data and the product identifier from the one or more records;
instructing the transmitter to transmit the encrypted purchase card data and a request for payment of a monetary amount corresponding to the one or more products, to the payment gateway via network interface connection and the communications network, and
instructing the transmitter to transmit via the network interface connection and the communications network, an order for the one or more products to the fulfillment party.

12. The system of claim 11, wherein the graphical user interface is further configured for reading a period of time and a specified day within the period of time, wherein the period of time and specified day are defined by the buyer.

13. The system of claim 11, wherein the processor of the server is further configured for calculating a commission for an individual associated with the mobile computing device, wherein the commission is based on the monetary amount corresponding to the one or more products.

14. The system of claim 13, wherein the processor of the server is further configured for effectuating a transfer of the commission to the individual associated with the mobile computing device.

* * * * *